Patented Mar. 11, 1947

2,417,299

UNITED STATES PATENT OFFICE 2,417,299

FAT-SOLUBLE VITAMIN SOLUTIONS

Louis Freedman, Mount Vernon, and Edward Green, New York, N. Y., assignors to U. S. Vitamin Corporation, a corporation of Delaware No Drawing. Application August 6, 1943, Serial No. 497,704

15 Claims. (Cl. 167—81)

This invention relates to aqueous solutions of normally water-insoluble substances, methods of preparing the same and, more particularly, to aqueous solutions of lipoid soluble substances having high vitamin activity.

The invention provides aqueous solutions of normally water insoluble materials that show the properties of true solutions in clearness, stability, and freedom from clouding on dilution with additional large volumes of water and a convenient method of making such solutions.

Many attempts have been made heretofore to solubilize or dissolve in aqueous media the normally water insoluble vitamins, particularly vitamin A or vitamin D or mixtures of these vitamins. For this purpose, various known water and lipoid miscible substances have been tried, among them ethyl alcohol, glycerol, glycerides, other esters of fatty acids, certain diols, esters of various sugars and sugar anhydrides, and liquid amides of fatty acids. All of these substances give emulsions or dispersions as the final products when added to or mixed with water, milk or other aqueous media, the undissolved vitamin either causing visible cloudiness or actually settling out.

Emulsifying and dispersing agents of various types have also been used in the effort to overcome these disadvantages. In all cases, however, the resulting products obtained have been either emulsions or dispersions having limited stability and limited practical application. While the art of preparing emulsions or dispersions of normally water-insoluble substances in aqueous media, commonly referred to as oil in water type emulsions, is rather broad, there has been no satisfactory solution of the problem of preparing vitamin solutions suitable for human dietary or therapeutic purposes in which the lipoid soluble vitamins are evidently in solution in the aqueous media and remain so indefinitely. By the term solution as used herein in connection with the lipoid soluble and water insoluble substances we mean solutions which are clear, show no dispersion visible to the naked eye, and remain so indefinitely.

Briefly stated, the invention comprises the method of and the compositions resulting from mixing lipoid soluble and normally water insoluble vitamins or like substances with water and a solubilizing agent of kind to be described. In the preferred embodiment, the invention comprises the formation of compositions that appear to be true solutions by the use of lipoid soluble vitamins in practically fat free condition, water, and a polyalkylene oxide complex of an ester of a polyhydric aliphatic alcohol or anhydride derivative of which the mono esters of higher fatty acids with sorbitan combined with ethylene oxide groups are particularly satisfactory.

The solubilizing agents in the proportions used in the preparation of products for dietary or therapeutic purposes must meet the following specifications: non-toxic, good solvents for the lipoid soluble substances to be placed in aqueous solution, miscible with water, stable, compatible with the substances to be dissolved, free from imparting disagreeable odor or taste to the resulting preparations, and not readily volatile.

Excellent solubilizing agents meeting these general requirements are the fatty acid esters of water-soluble polyhydric aliphatic alcohols or derivatives modified by reaction with a plurality of alkylene oxide groups. Such agents are water-soluble and also excellent solvents for lipoid soluble substances. These products comprise a series of polyalkylene oxide derivatives of partially esterified polyhydric alcohols or their anhydrides. The esters and polyoxyalkylene derivatives that may be used by us are described in the patent literature, as wetting, cleansing and dispersing agents in the textile and allied industries.

In general, it can be said that the art of using the above described derivatives to form emulsions and dispersions of oleaginous or so-called water-repellent materials with aqueous or water-soluble materials, is fairly well defined. In contrast to this, however, there has been no suggestion of a method of forming compositions of matter wherein water-insoluble, lipoid soluble substances are in solution in an aqueous medium, as distinct from being in an emulsified or dispersed state.

The lipoid substance to be dissolved must be of certain special kind. We have discovered that not all water-insoluble, lipoid soluble substances are satisfactory in forming solutions in aqueous media. We have found that only those lipoid soluble substances that are substantially free of fats (glycerides of the higher fatty acids) will give the desired clear solutions with water and the solubilizing agent.

The term "lipoid soluble" is used herein to mean normally soluble in fats and fat solvents.

In the preferred method of practicing our invention, we use such lipoid soluble substances as high potency vitamin A concentrates substantially free of fats, high potency vitamin D concentrates either natural or synthetically prepared but substantially free of fats, and high potency vitamin E concentrates known as alpha tocopherol either natural or synthetically prepared but substantially free of fats and the like. These may be dissolved in a very large volume of water with the use, as solubilizing agent, of a relatively small proportion of alkylene oxide derivatives of the mono fatty acid esters of polyhydric alcohols or their anhydride derivatives wherein the number of ethylene oxide groups to the molecule is not less than 16. This type of solution is perfectly clear to the naked eye and is readily distinguishable from an emulsion or dispersion since it does not break up or eventually settle out or become turbid when added to even greater volumes of water or aqueous media. In other words, the solution is permanently clear.

Among the solubilizing agents which we have found particularly suitable for the present purpose are the polyethylene oxide derivatives of sorbitan monolaurate, monopalmitate, monostearate, monooleate, the complex of monostearate of propylene glycol with 25 mols of ethylene oxide, and the like complex of the monooleate ester of ethylene glycol with 20 mols of propylene oxide. These derivatives are considered as partial esters of polyhydric alcohols with fatty acids in which the acid radical or radicals are joined to a carbon atom or carbon atoms of the polyhydric alcohol and one or more of the remaining alcohol groups are reacted with alkylene oxide molecules, suitably 16 or more mols of alkylene oxide per mol of partial ester. The acid which is esterified with the polyhydric alcohol is a long chain fatty acid containing not less than 12 carbon atoms to the molecule, as, for example, lauric, stearic, palmitic or oleic acid. For best results, the ethylene oxide or other alkylene oxide used should not be introduced in such large proportion as to make the resulting complex one that melts at a temperature above 100°, suitably not above 80° C., the melting point of the complex controlling the temperature of compounding the solutions of the present invention. For best results the number of alkylene oxide groups should be about 16 to 25.

All these compounds may be made by methods that are usual in making such alkylene oxide complexes, the monoester selected and also the alkylene oxide used being those desired in the finished product.

A typical example of one of these derivatives is sorbitan monolaurate modified by the introduction of 20 ethylene oxide molecules to the molecule of the final complex compound.

Sorbitan, being the anhydride of sorbitol, is readily soluble in water. The monolauric acid ester of sorbitan is soluble in ethyl alcohol and other fat solvents but, on the other hand, only dispersible in water. It has lipophilic and fair hydrophilic properties. This ester will react with ethylene oxide under known conditions, so that the free hydroxyl groups of the sorbitan are modified, to give an addition product having a plurality of ethylene oxide groups. For convenience, these ethylene oxide addition products are sometimes referred to herein as "ethylene oxide complexes." The introduction of the ethylene oxide increases the hydrophilic properties of the product without greatly affecting its lipophilic properties.

We have found that the lipoid soluble vitamins and certain other lipoid soluble substances having hormone-like or medicinal properties, when substantially fat-free, will dissolve in the above described ethylene oxide complexes and that solutions so formed are miscible with water or aqueous media in practically all proportions without clouding. On the other hand, fats, which are also soluble in the ethylene oxide complexes in varying degree, will give solutions which are not completely miscible with water or aqueous media, but instead give emulsions and unstable dispersions.

For the various lipoid soluble substances, different proportions of the ethylene oxide complexes are required. In general, we have found that for one part of the lipoid soluble vitamins, approximately 5 to 20 and preferably 8 to 12 parts of the ethylene oxide complex are required. The hydrophilic properties of the mixtures, i. e., the miscibility of the solutions in water, are a function of the proportions of ethylene oxide complex used. In general the proportions of solubilizing agent and water should be such that in the finished solution of all the components there are approximately 3 to 10 parts and suitably 5 to 10 parts of the solubilizing agent to 100 parts of the finished solution.

In place of ethylene oxide in the complexes described there may be used other lower alkylene oxides, as, for example, 1,2 propylene oxide or 1,3 propylene oxide.

To obtain a high potency of vitamin A in an aqueous medium, we have found it convenient to use a high potency vitamin A concentrate substantially free of fat and of unsaponifiable substances other than the vitamin A. Such a concentrate, suitably one having a vitamin A potency up to 1½ to 2 million or more U. S. P. units per gram, has been found to be very suitable as the lipoid soluble substance to be placed in aqueous solution.

For a source of vitamin D, we have found it desirable to use either a high potency vitamin D concentrate substantially free of fat obtained from fish livers or fish liver oils by saponification and solvent extraction and further purification, crystalline vitamin D known as calciferol or crystalline vitamin $D_2$ obtained from activated ergosterol by purification to a very high degree or from an activated ergosterol non-crystalline resin obtained by steps of purification of a lesser degree than that above. Other forms of synthetic vitamin D, such as activated 7-dehydrocholesterol may be used for this purpose.

In adapting the vitamin solutions previously described to dietary use, there may be added other substances not incompatible with the mixture and soluble therein, such as conventional sweetening, coloring, flavoring or viscosity increasing agents. We have found that substances such as glycerin add body to the mixture. Sucrose, glucose and other sugars act as sweetening agents and also increase the viscosity of the solutions. Flavoring or certified coloring agents which are soluble in the mixtures may be utilized for purposes of palatability. These substances, however, are not essential to the invention since they do not contribute materially to the solubilizing of the lipoid soluble vitamins in aqueous media.

We have also discovered that the aqueous solutions containing the normally water insoluble vitamins A and D and made as described herein are readily adaptable for the incorporation of one or more of the known water soluble vitamins. These latter include vitamin $B_1$ or thiamine, vitamin $B_2$ or riboflavin, vitamin $B_6$ or pyridoxine, vitamin C or ascorbic acid, and nicotinic acid or its amide. Other water soluble vitamins may be included as well as other fat soluble vitamins such as vitamin E or alpha tocopherol and vitamin K. While the water-soluble vitamins derived from natural sources may be used for the above described purposes, it is preferable to use the easily obtainable synthetic vitamins which are now available in pure crystalline form.

The incorporation of the water soluble vitamins together with the normally lipoid soluble vitamins in amounts sufficient to be of dietary or therapeutic value in a clear and stable concentrated aqueous solution without emulsion formation or without the use of alcohol is a distinct improvement over the presently known art. It has distinct advantages and utility in ease of administration to infants, children, and others who cannot take food or medication other than in liquid form. It can be incorporated in foods such as milk and other aqueous fluids in which complete miscibility is obtained, thus materially increasing absorption of the vitamins by the alimentary system.

The method of dissolving the vitamins or other lipoid soluble substances is, in general, the mixing of the said substances and solubilizing agent in the proportions desired in the finished composition. Water or other aqueous medium may be added. The mixing is continued until the resulting product appears to be a uniform clear solution.

The invention will be further illustrated by the following specific examples of the practice of it.

*Example 1*

0.544 gram of a vitamin A concentrate having a potency of 1,838,000 U. S. P. units per gram, prepared from a fish liver oil by saponification and extraction of the unsaponifiable fraction by solvent extraction and further purification, was dissolved in 5.1 grams sorbitan monolaurate (ethylene oxide )20 by stirring for several minutes. (The number after the ethylene oxide indicates the number of mols of the alkylene oxide to a mol of the monolaurate.) Slight warming, preferably in an inert atmosphere, facilitates solution. The solution so prepared was then added with stirring to distilled air-free water to make a total volume of 100 ml. A clear light yellow colored solution which remained clear indefinitely was obtained. The solution so prepared assays in excess of 10,000 U. S. P. units per ml. and contains approximately 5% of the ethylene oxide complex.

This solution so made can be further diluted with water to give clear solutions without forming emulsions or visible dispersion. The solution is suitable for oral use as a source of dietary vitamin A. The solution may be filled into ampules and sterilized and used parenterally as a source of vitamin A for therapeutic purposes. Also, the aqueous solution may be diluted with milk, soup, fruit juice, or other beverage for dietary use.

Such a solution was sterilized and then stored at 25° C. for 5 months without any appreciable loss of vitamin A. Heretofore it has not been possible to prepare and store a vitamin A solution (actually an emulsion) having the same potency without losing a large part of the vitamin A activity in less than one month's time.

*Example 2*

0.223 gram of crystalline vitamin A alcohol having an approximate vitamin A potency of about 3 million units per gram was dissolved in 2.691 grams of sorbitan monolaurate (ethylene oxide) 20 with stirring at room temperature in an atmosphere of nitrogen gas, to give a yellow moderately viscous solution. Assay of this solution indicated that it contained a vitamin A potency of 217,360 U. S. P. units per gram. This solution is completely miscible with water, milk, and other aqueous fluids in all proportions, without clouding.

1.61 grams of the above solution were added with moderate stirring to 15.89 ml. distilled air-free water to make 17 ml. of a clear, light yellow solution without emulsification or visible dispersion and having a vitamin A potency of 20,000 U. S. P. units per ml.

*Example 3*

0.4167 gram of irradiated ergosterol resin having a potency of 12 million U. S. P. vitamin D units per gram was dissolved in 5.0 grams of sorbitan monolaurate (ethylene oxide)20 with stirring. Slight warming, preferably in an inert atmosphere, facilitates solution. This solution was poured with stirring into distilled water sufficient to make a total volume of 100 ml. There was obtained a clear, almost colorless solution, free of oily dispersed or emulsified particles which contains 50,000 U. S. P. D units per ml. and is suitable for oral use as a source of vitamin D. When added to more water or other aqueous media, clear solutions without emulsification or visible dispersion and which remain stable indefinitely are obtained. Thus, 1/50 of an ml. or approximately 1 small drop of this solution containing 1000 U. S. P. units of vitamin D or larger quantities may be added to milk, fruit juices, soups or other foods and administered to infants, children and others as a convenient form of vitamin D.

The solution containing 50,000 D units per ml. as such or further diluted with water may also be sterilized in ampules or vials, and as such are suitable for parenteral administration.

*Example 4*

0.924 gram of a mixture of vitamin A and D concentrate prepared from fish liver oils by saponification and extraction of the unsaponifiable fraction by solvent extraction and further purification and having a vitamin A potency of 880,000 U. S. P. units and a vitamin D potency of 440,000 U. S. P. units, was dissolved in 9.24 grams of sorbitan monolaurate (ethylene oxide) 20 by gentle stirring under an atmosphere of nitrogen gas. The use of an inert gas in this respect is not essential but helps to protect the vitamin A against initial oxidation. The resulting yellow, moderately viscous solution was poured with stirring into an amount of distilled air-free water sufficient to make 80 ml. to give a clear solution without emulsification or visible dispersion and containing in excess of 10,000 U. S. P. units of vitamin A and 5,000 U. S. P. units of vitamin D per ml.

This solution is readily adaptable for use as a source of vitamins A and D. 0.1 of an ml., approximately 1.5 minims, when added to water, milk, or other liquid food will furnish 2000 U. S. P. units of vitamin A and 1000 U. S. P. units of vitamin D, which is more than the recognized daily requirement of an infant.

*Example 5*

To 30 grams of glycerin and 45 grams of simple syrup in 30 ml. of water are added 0.0667 gram of riboflavin and 0.7335 gram of nicotinic acid amide. The solution was heated with stirring in absence of light until the riboflavin had dissolved. The solution was then cooled to about 25–30° C. and 0.2084 gram of thiamine hydrochloride and 5.0 grams of ascorbic acid were then added, and the mixture stirred at about 20–25° C. until solution was complete. This solution is identified as solution I.

0.525 gram of vitamin A concentrate, prepared from fish liver oils as described in Example 1 and having a vitamin A potency of 1,600,000 U. S. P. units per gram, and 0.00672 gram of irradiated ergosterol resin having a vitamin D potency of 12,500,000 U. S. P. units per gram were dissolved with stirring at room temperature in 4.5 grams of sorbitan monolaurate (ethylene oxide)$_{20}$. Moderate warming, not over 60° C., although not essential, facilitates solution of the vitamins. This vitamin A and D solution is identified as solution II.

Solution II was added slowly and with stirring to solution I until completely mixed. To the resulting solution there were then added with stirring 1.7 ml. of 5 normal sodium hydroxide solution and, finally, distilled water in amount to make a total volume of 100 ml.

All of the above operations are preferably carried out under an inert atmosphere such as nitrogen gas, although such precaution is not essential to the operation of the invention in successful manner.

The final solution, having a pH of about 4.0, is a deep yellow colored solution, having unusual clarity and stability without emulsification or visible dispersion, and remains clear indefinitely.

The above described solution contains vitamin potencies in excess of the following per ml.:

Vitamin A—6600 U. S. P. units
Vitman D—600 U. S. P. units
Vitamin B$_1$—1.66 mgm.
Vitamin B$_2$—0.66 mgm.
Vitamin C—40.0 mgms.
Nicotinamide—6.6 mgms.

Such a solution assayed 5 months after preparation showed no significant loss of potency of any of the vitamins, indicating a high degree of stability.

Such a solution also contains per ml. more than 100% of the recognized daily vitamin requirements for infants and children. It is completely miscible in all proportions when added to water, milk, fruit juices, and other aqueous foods or beverages without the development of turbidity and does not deposit insoluble oil droplets on standing. It thus serves as an ideal medium for incorporating the lipoid soluble and also the water soluble vitamins for dietary, prophylactic or therapeutic purposes.

Example 6

0.544 gram of a vitamin A concentrate having a potency of 1,838,000 U. S. P. units per gram, as described in Example 1, was dissolved in 6.0 grams sorbitan monopalmitate (ethylene oxide)$_{20}$. The solution so prepared was then added with stirring to distilled air-free water to make a total volume of 100 ml. This solution contains in excess of 10,000 U. S. P. vitamin A units per ml. and approximately 6% of the ethylene oxide complex of sorbitant monopalmitate. It may be added to water, milk or other aqueous media to give clear stable solutions without emulsification or visible dispersion and is adaptable as a source of vitamin A for dietary and therapeutic purposes.

Example 7

0.544 gram of a vitamin A concentrate as described in Example 6 is dissolved in 6.0 grams of sorbitan monooleate (ethylene oxide)$_{20}$. The solution so prepared was then added with stirring to distilled air-free water to make a total volume of 100 ml. This solution contains in excess of 10,000 U. S. P. units of vitamin A per ml. and approximately 6% of the ethylene oxide complex of sorbitan monooleate. It may be used as described in Example 6.

Example 8

0.1575 gram of a vitamin A concentrate having a potency of 1,589,000 U. S. P. units per gram, and prepared from a fish liver oil by saponification and recovery of the unsaponifiable fraction of the oil by solvent extraction and further purification, and being substantially free of fat, was mixed with 1.6 grams of propylene glycol monostearate (ethylene oxide)$_{25}$ and warmed on a water bath at about 40° C. under nitrogen gas until a uniform melt was obtained. The solution so prepared was then added with stirring to distilled air-free water to make a total volume of 25 ml. This solution contains 10,000 U. S. P. units of vitamin A per ml. and approximately 6.4% weight to volume of the ethylene oxide complex of propylene glycol monostearate. It may be used as described in Example 6.

Example 9

0.1 gram of alpha-tocopherol (synthetic vitamin E) was dissolved in 1.0 gram of sorbitan monolaurate (ethylene oxide)$_{20}$ with stirring for several minutes at room temperature. This solution was added with stirring to 25 ml. distilled water. A clear, pale yellow-colored solution, free of oil, emulsified particles or visible dispersion was obtained. This solution contains 4 mgms. of alpha-tocopherol per ml., and is suitable for oral or therapeutic use as a source of vitamin E. When added to water or more aqueous liquid, clear solutions, which remain stable for long periods, are obtained.

In the examples above, there is used at least approximately 8 parts of the solubilizing agent to 1 of the vitamin material. In Example 5, for instance, there are used 8.5 parts of sorbitan monolaurate (ethylene oxide)$_{20}$ to 1 of the vitamin A concentrate.

Various changes and modifications from those described in the above examples may be made in the compositions and methods of carrying out the invention. For example, mixtures of two or more of the ethylene oxide complexes may be used as solubilizing agents for the lipoid soluble vitamins. Other desirable substances or ingredients may be added provided such additions are mutually compatible with the basic ingredients as described in the examples.

It will be understood also that it is intended to cover all changes and modifications of the examples of the invention herein chosen for the purpose of illustration which do not constitute departures from the spirit and scope of the invention.

What we claim is:

1. A composition of matter comprising a lipoid soluble, normally water insoluble, substantially fat free material having high vitamin activity and a solubilizing agent dissolving the material and causing the material to be soluble in water in all proportions to give a stable clear solution without visible emulsification or dispersion, the solubilizing agent being a water soluble polyalkylene oxide derivative of a partial long chain fatty acid ester of a compound selected from the group consisting of polyhydric alcohols and their anhydrides and the said agent having a melting point not above 100° C.

2. A composition of matter comprising vitamins A and D in substantially fat free condition, a water soluble polyalkylene oxide derivative of a monoester of sorbitan with a fatty acid containing at least 12 carbon atoms, and water, the said polyalkylene oxide derivative having a melting point not above 100° C. and causing the vitamins to dissolve in the water with the production of a stable clear solution.

3. A composition of matter as described in claim 1, the solubilizing agent containing 16 to 25 mols of the alkylene oxide to 1 mol of the said fatty acid ester, the alkylene oxide being ethylene oxide, and the composition including water forming a clear solution with the said substantially fat free material and solubilizing agent.

4. A composition as described in claim 1, the solubilizing agent being a polyethylene oxide derivative of the partial ester of sorbitan with a higher fatty acid.

5. A composition of matter as described in claim 1 including water forming a clear solution with the said material of high vitamin activity and solubilizing agent, the solution remaining clear and free from settling indefinitely, and the proportion of the solubilizing agent being at least 8 parts to 1 of the material of high vitamin activity.

6. A composition of matter as described in claim 2, the water constituting at least one-half of the total volume of the composition.

7. A composition of matter as described in claim 1, the proportion of the solubilizing agent being approximately 5 to 20 parts for 1 part of the lipoid soluble material.

8. A composition of matter comprising a lipoid soluble, water insoluble, substantially fat free vitamin and sorbitan monolaurate (ethylene oxide)$_{20}$ serving to make the composition soluble in water to form a permanently clear solution.

9. A composition of matter as described in claim 1 including water forming the whole into a clear aqueous solution, the proportion of the solubilizing agent being 3 to 10 parts for 100 parts of the said aqueous solution.

10. A composition of matter consisting of a stable clear solution comprising a major proportion of water, a substantially fat free vitamin A concentrate, and a water soluble polyalkylene oxide derivative of a partial higher fatty acid ester of a compound selected from the group consisting of polyhydric alcohols and their anhydrides, the said ester having a melting point not substantially above 100° C. and being present in the proportion of at least 8 parts by weight to 1 part of the vitamin A.

11. A composition of matter comprising vitamins A and D in substantially fat free condition and a solubilizing agent dissolving the vitamins and causing the vitamins to be soluble in water in all proportions to give a stable clear solution without visible emulsification or dispersion, the solubilizing agent being a water soluble poly-lower-alkylene-oxide complex and long chain fatty acid partial ester of a compound selected from the group consisting of polyhydric alcohols and their anhydrides and the said agent having a melting point not above 100° C.

12. A solution of a fat-soluble vitamin in a solvent comprising a polyoxyalkylene derivative of a monoester of sorbitan with a higher fatty acid, said solution being substantially free from triglycerides and readily dispersible in water.

13. A solution of a fat-soluble vitamin in a solvent comprising a polyoxyalkylene derivative of sorbitan monooleate, said solution being substantially free from triglycerides and readily dispersible in water.

14. A composition of matter comprising a lipoid soluble, normally water-insoluble, substantially fat free material having high vitamin activity and a solubilizing agent dissolving the material and causing the material to be soluble in water to give a solution, the solubilizing agent being a water soluble ethylene oxide derivative of a monoester of a fatty acid containing 12 to 18 carbon atoms with a compound selected from the group consisting of polyhydric alcohols and their anhydrides containing 2 to 6 carbon atoms to the molecule of the said compound, the said agent containing 16 to 25 mols of ethylene oxide to 1 mol of fatty acid and having a melting point not above 100° C.

15. A composition of matter as described in claim 1, the said material having high vitamin activity being vitamin D.

LOUIS FREEDMAN.
EDWARD GREEN.

REFERENCES CITED

The following references are of record in the file of this patent:

UNITED STATES PATENTS

| Number | Name | Date |
| --- | --- | --- |
| 1,959,930 | Schmidt | May 22, 1934 |
| 1,970,578 | Schoeller | Aug. 21, 1938 |
| 2,167,144 | Barton et al | July 25, 1939 |

OTHER REFERENCES

Atlas—Atlas Spans and Atlas Tweens (Copyright 1942, Atlas Powder Co.) pages 7, 8, 9, 10 (167–85W). (Copy in Div. 43.)